Dec. 23, 1952 E. GERBER 2,622,551
MEANS FOR PRODUCING EMBROIDERIES
Filed Dec. 30, 1949 9 Sheets-Sheet 1
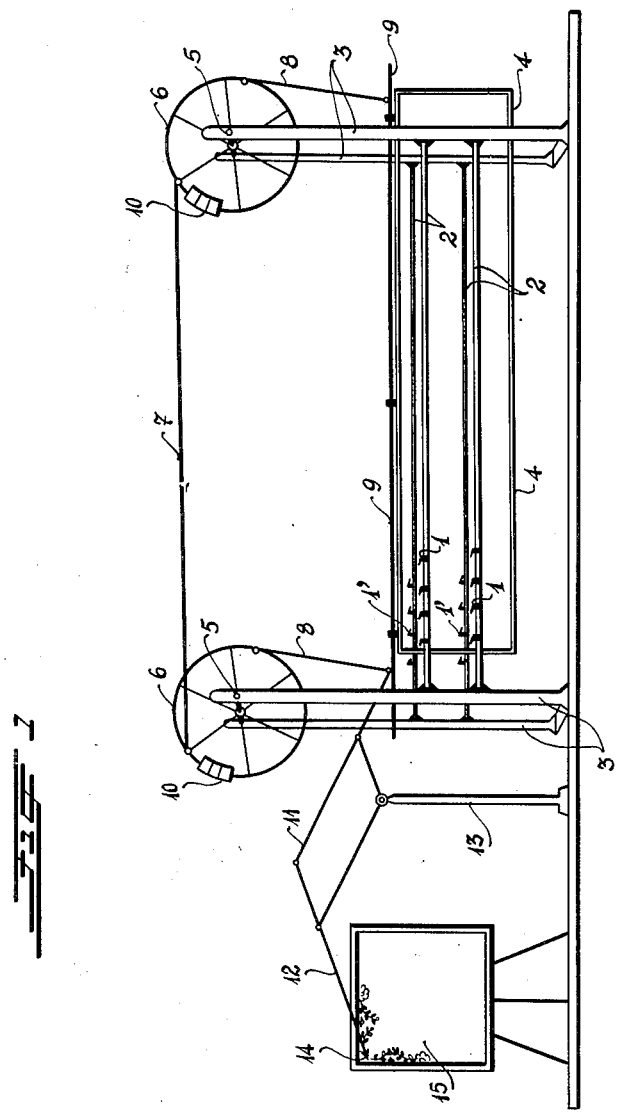
Inventor
Eugène Gerber
by

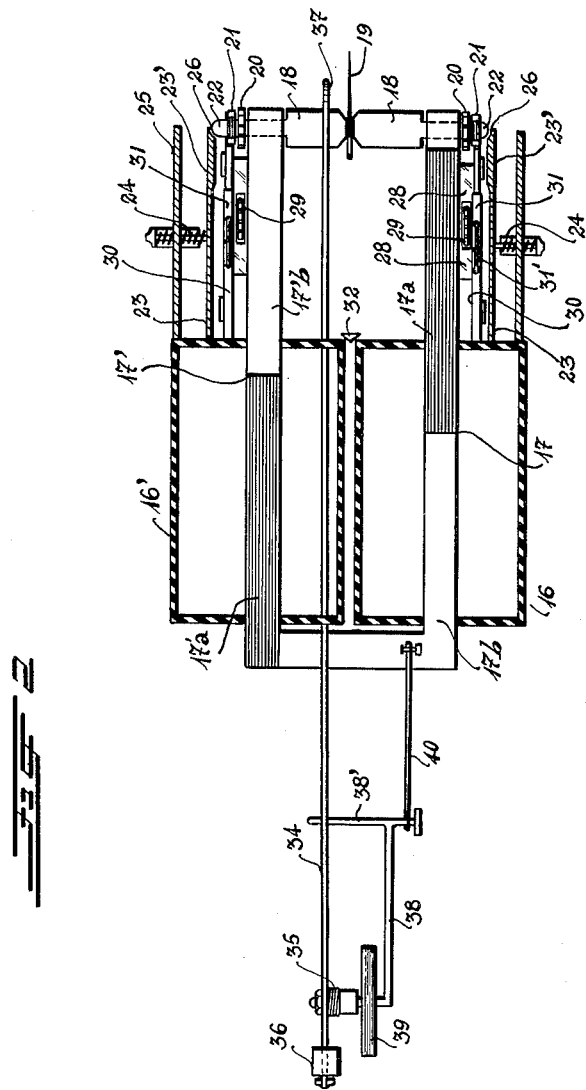

Dec. 23, 1952  E. GERBER  2,622,551
MEANS FOR PRODUCING EMBROIDERIES
Filed Dec. 30, 1949  9 Sheets-Sheet 3
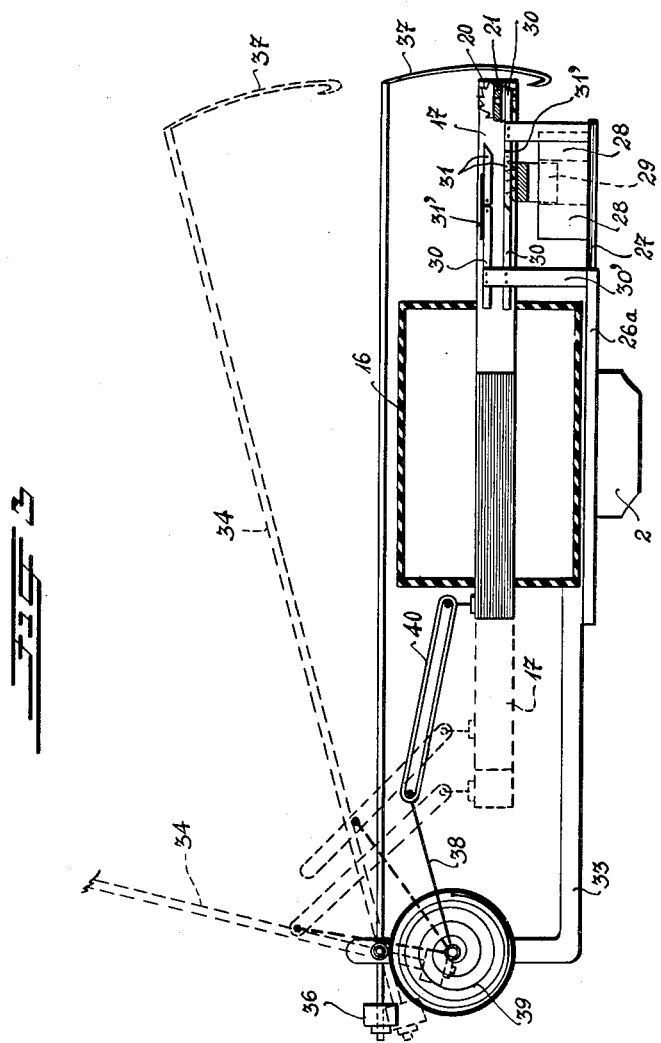

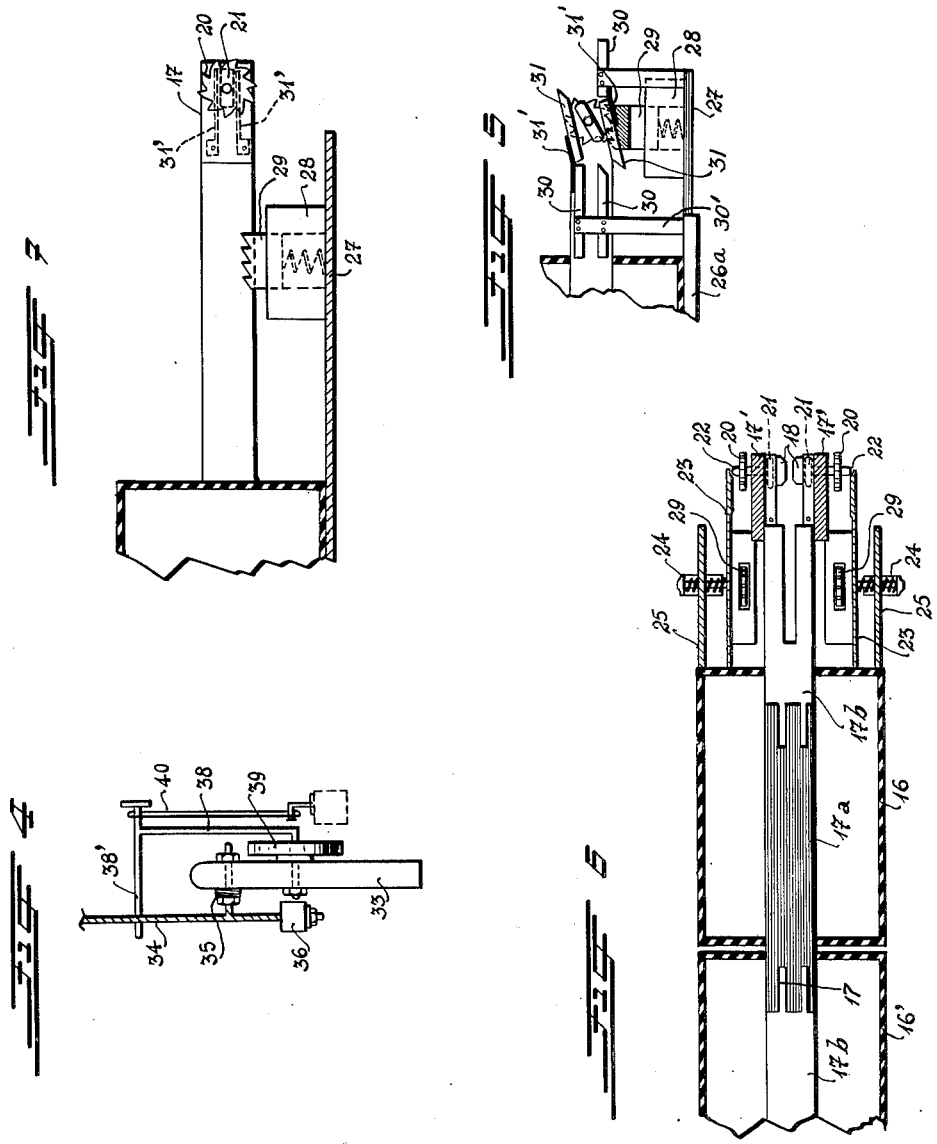

Dec. 23, 1952          E. GERBER          2,622,551
MEANS FOR PRODUCING EMBROIDERIES
Filed Dec. 30, 1949          9 Sheets-Sheet 5
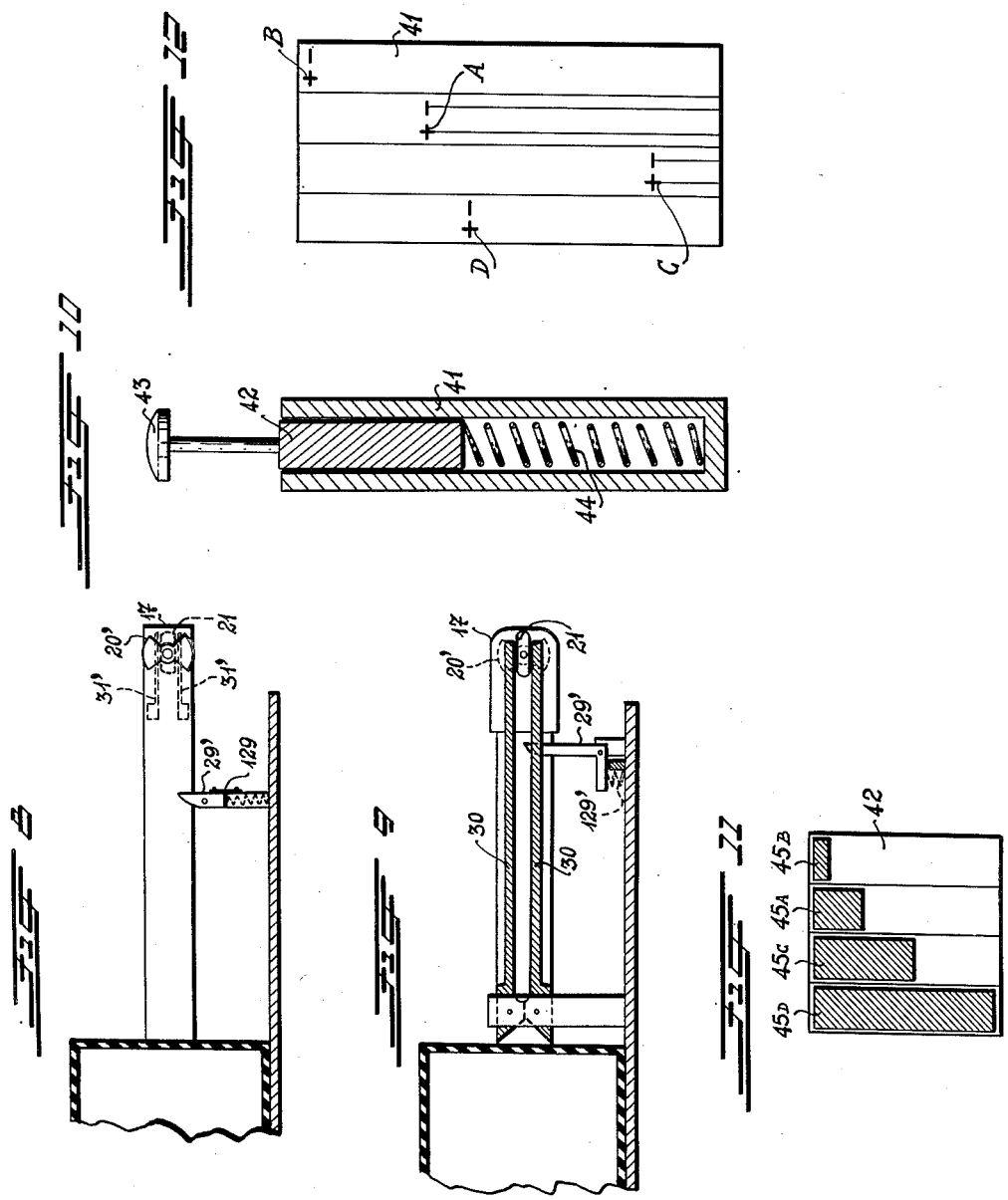

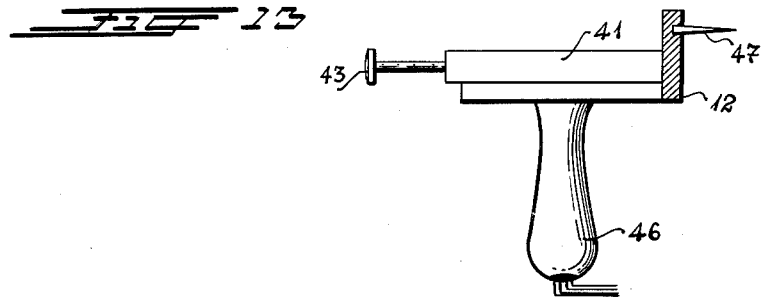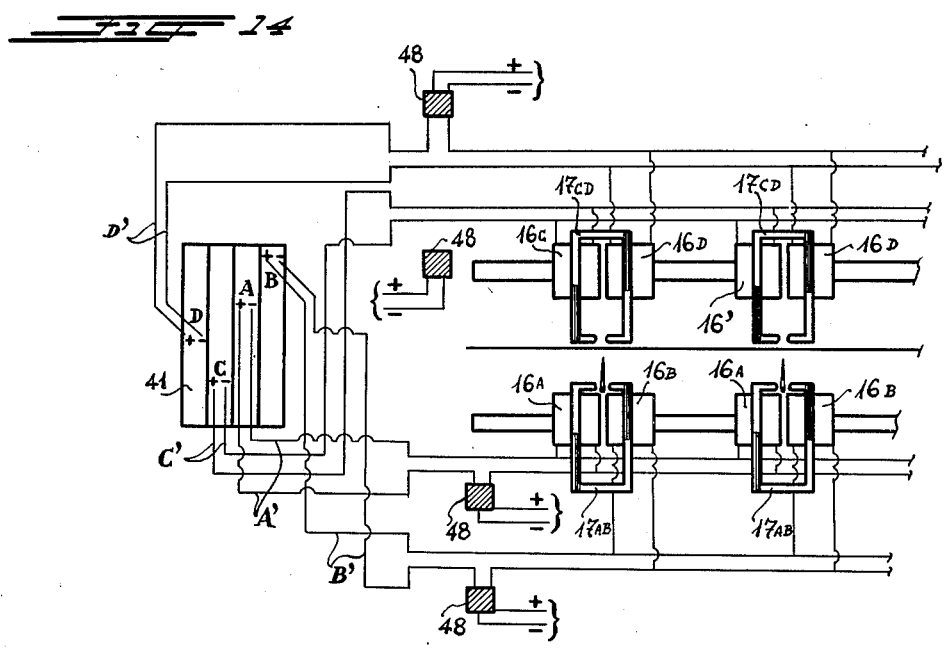

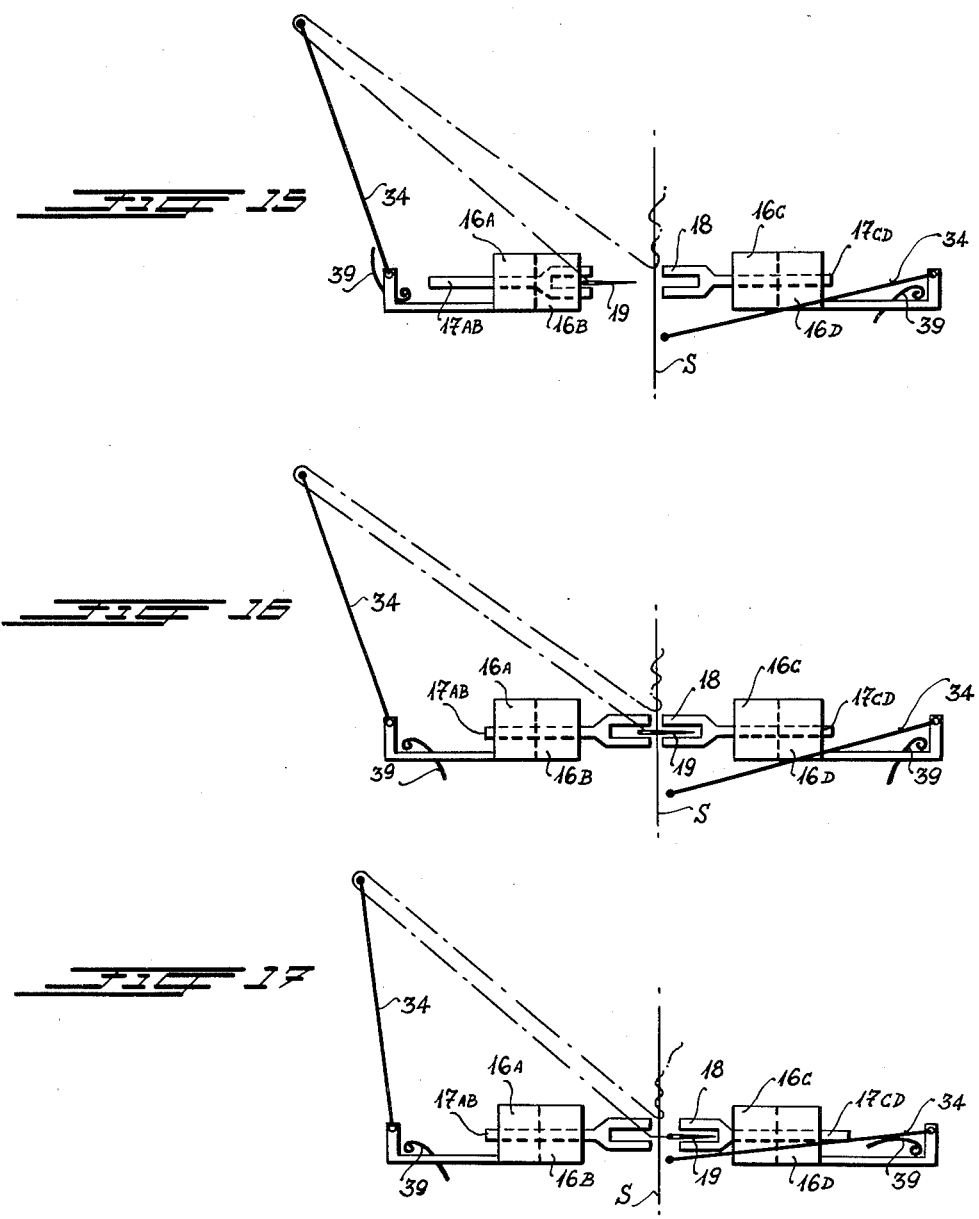

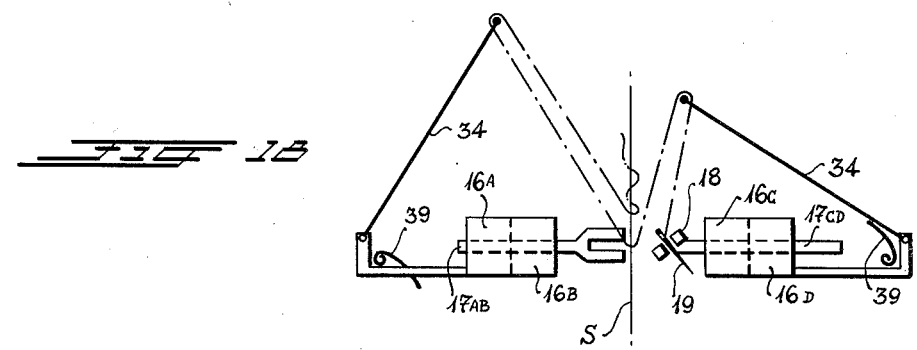
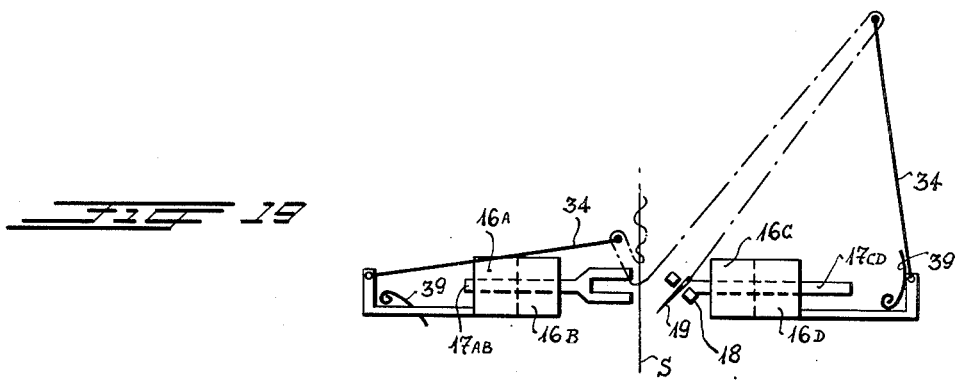
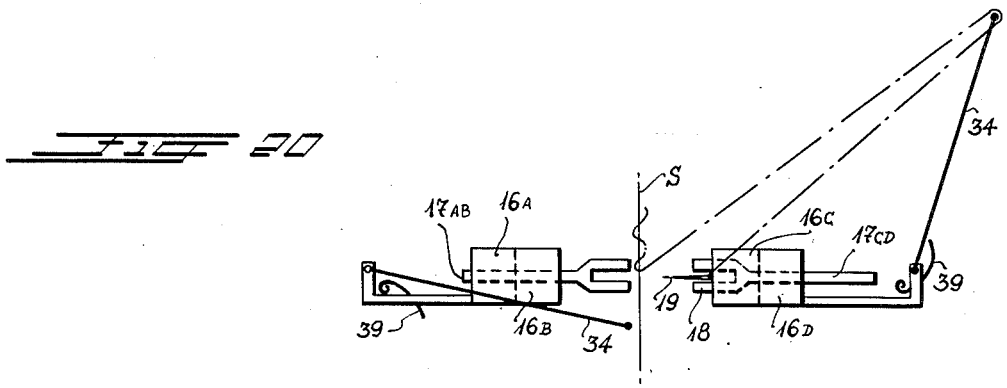

Dec. 23, 1952   E. GERBER   2,622,551
MEANS FOR PRODUCING EMBROIDERIES
Filed Dec. 30, 1949   9 Sheets-Sheet 9
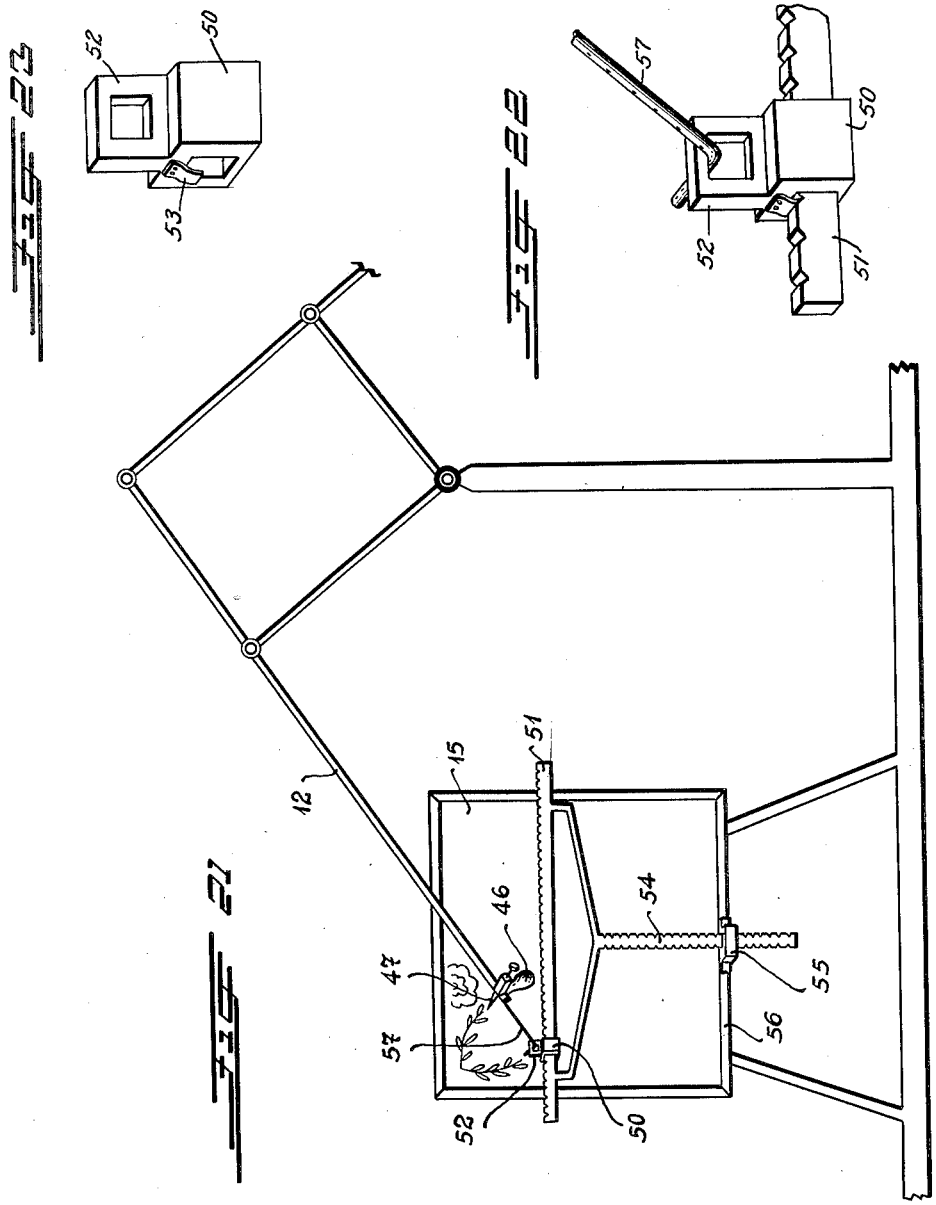

UNITED STATES PATENT OFFICE 2,622,551

MEANS FOR PRODUCING EMBROIDERIES

Eugène Gerber, Buenos Aires, Argentina

Application December 30, 1949, Serial No. 135,923
In Switzerland July 26, 1949

22 Claims. (Cl. 112—94)

My present invention relates to the art of producing embroideries, and more particularly refers to a new method for mechanically executing embroidery works and to new means for carrying out this method.

The known embroidering apparatus, in general, operate with two threads, with shuttle and bobbin, and practically embroider on one face of the cloth only. In hand-worked embroidery but one thread is used which passes through the cloth in one direction and returns in the opposite direction. In view of these details, the mechanically produced embroidery may be easily recognized as such.

Now, the main object of my invention is to provide method and means for mechanically producing embroideries in the same manner as the hand-worked embroideries, so that they do not in any way differ from the latter.

One object of my invention is to provide a new method for producing embroideries, which comprises handling a usual threaded embroidering needle during the complete embroidering process by means of a pair of mechanic embroidering hands in such a manner that the resulting embroidery practically cannot be distinguished from hand-worked embroidery.

Another object of my invention is to provide a new method for producing embroideries, which comprises simultaneously handling a number of usual threaded embroidering needles during the complete embroidering process by means of pairs of co-operating mechanical embroidering hands, with the advantageous result that embroidery works may be executed with a minimum of expensive manual work.

One important object of my invention is to provide a new method for producing embroideries, which comprises handling a usual threaded embroidering needle during the complete embroidering process by means of a pair of electro-mechanical embroidering hands and pulling the embroidery thread after each stitch through the cloth by causing elastic means to operate a tensioning mechanism and controlling said elastic means by said electro-mechanical hands, with the advantage that the embroidery work is produced in a perfect and uniform manner.

Another important object of the invention is to provide a new method for producing embroideries, which comprises simultaneously handling a number of usual threaded embroidering needles during the complete embroidering process by means of a like number of pairs of electro-mechanical embroidering hands and pulling said embroidery threads after each stitch of said needles through the cloth by causing elastic means of said electro-mechanical hands to operate tensioning mechanisms and controlling said elastic means by said electro-mechanical hands, thus automatically multiplying the embroidery produced by one pair of such hands.

An additional object of the invention is to provide a new method of producing embroideries, which comprises simultaneously handling a number of usual threaded embroidering needles during the complete embroidering process by means of a like number of pairs of mechanical embroidering hands causing these embroidering hands to operate simultaneously by moving to and fro the displaceable supports of said embroidering hands, and pulling the embroidery threads after each stitch of said needles through the cloth by causing elastic means associated with said mechanical embroidering hands to operate tensioning mechanisms and controlling said elastic means by said embroidering hands.

A further object of the invention is to provide a new method for producing embroideries, as set forth in the preceding paragraphs, wherein the cloth on which the embroidery is produced, after each stitch, is displaced between co-operating mechanical embroidering hands in such a manner that the next stitch will be made on the point determined in accordance with a given pattern of embroidery.

Another object of the invention is to provide a new method for producing embroideries as set forth, wherein the cloth on which the embroidery is produced, is stationary and the opposite co-operating electro-mechanical embroidering hands, after each stitch, are simultaneously and equally displaced in such a manner that the next stitch will be made on the point determined in accordance with a given pattern of embroidery.

Still another object of my invention is to provide a new embroidering apparatus for carrying out the method as set forth, which comprises an embroidery frame for the cloth on which the embroidery is to be produced, and at least two opposite co-operating mechanical embroidering hands, one on each side of said cloth, electro-magnetic means of operating said embroidering hands, and combined means for controlling said embroidering hands and for determining the stitch points in accordance with a given pattern of embroidery.

A further object of the invention is to provide a new embroidering apparatus, which comprises a movable embroidery frame for the cloth on which the embroidery is to be produced, at least two opposite co-operating electro-mechanical embroidering hands, one on each side of said cloth, combined switch and frame-operating means for controlling said electro-mechanical embroidering hands and for moving said embroidery frame in order to determine the stitch points in accordance with a given pattern of embroidery.

An additional object of the invention is to provide a new embroidering apparatus, which comprises a stationary embroidery frame for the cloth on which the embroidery is to be produced, at least two opposite movable co-operating electro-mechanical embroidering hands, one on each side of said cloth, and combined switch and operating means for controlling said electro-mechanical embroidering hands and for moving the latter in order to determine the stitch points in accordance with a given pattern of embroidery.

An important object of the invention is to provide, for use in the embroidering apparatus as set forth, pairs of co-operating electro-mechanical embroidering hands, each of these embroidering hands comprising electromagnetic means for moving to and fro a rigid composite core structure, needle-holding means provided at the front end of said core structure for handling a threaded embroidering needle, and thread-pulling means provided at the rear end of said core structure for pulling the embroidery thread after each stitch through the cloth on which the embroidery is to be produced.

Another important object of the invention is to provide an electro-mechanical embroidering hand as set forth in the preceding paragraph, including a mechanism in connection with the said movable core structure and the said needle-holding means for imparting a rotation to the latter derived from the linear movements of said core structure.

Still another important object of the invention is to provide an electromechanical embroidering hand as set forth, including a spring-operated thread-pulling mechanism, which comprises a thread-pulling lever provided with a thread-engaging hook, a spring-operated lever for lifting said thread-pulling lever, and rod means for connecting said spring-operated lever with the rear end of the said movable core structure and for controlling the said thread-pulling mechanism by the electro-magnetic means of the electro-mechanical embroidering hand.

A further important object of the invention is to provide an electro-mechanical embroidering hand as set forth, including electro-magnetic means consisting of two electro-magnetic coils and a rigid core structure, having at least one portion of electrical or core sheet material, in such an arrangement that when alternatively energizing said coils, said core structure is moved to and fro.

According to one feature of the invention, the electro-magnetic coils as referred to in the preceding paragraph are arranged one aside the other and have individual composite core members which are interconnected at their free ends so as to form a rigid rectangular core structure, wherein the core portions of electrical or core sheet material are situated diagonally opposite each other i. e. at opposite ends of the rectangular core structure, in such an arrangement that when alternatively energizing the electro-magnetic coils, said core structure is moved to and fro.

Another important object of the invention is to provide a new embroidering apparatus as set forth, wherein a number of pairs of electro-mechanic embroidering hands are electrically connected in series and to a hand-operated switch device so constructed that the different operations to be performed by said embroidering hands are absolutely under the control of the embroiderer or operator of the apparatus.

Still another object of the invention is to provide, for use in connection with the embroidering apparatus as set forth, a novel switch device comprising telescoping contact-carrying and contact-bridging members, with the electrical contacts and the bridging means, respectively, in such an arrangement that the current supply to the four coils of a pair of electro-mechanical embroidering hands is in perfect time coordination with the time required by the operations to be performed during and between the periods of current supply to said coils.

According to one feature of the invention, the electric switch device as referred to in the preceding paragraph is combined with a handle device provided with a pointed member and so arranged in the embroidering apparatus as set forth that it enables the embroiderer to make the adjustments of the apparatus according to the successive stitch points and to determine these stitch points on a given pattern of embroidery by means of said pointed member.

According to another feature of the invention, the combined handle and switch device is secured to the end of the free arm of a pantograph, the other free arm of which is pivotally connected to the movable part of the embroidering apparatus i. e. to the embroidery frame or to the movably arranged embroidery hands, respectively.

According to still another feature of the invention the combined handle and switch device is provided with a guide mechanism so constructed and arranged that it enables the embroiderer to easily make series of like stitches in a very uniform and accurate manner.

With these objects and advantageous features in view, the present invention comprises the arrangement, combination and construction of parts as will be hereinafter fully explained with particular reference to the accompanying drawings, on which a preferred embodiment of the invention has been illustrated by way of example only, and on which:

Fig. 1 is a general schematic view of the embroidering apparatus according to my invention, which operates with a number of pairs of electromechanical embroidering hands;

Fig. 2 is a detail plan view of one of the electro-mechanical embroidering hands;

Fig. 3 is a side elevation of the electro-mechanical embroidering hand as shown in Fig. 2;

Fig. 4 is a detail rear end view of the electro-mechanic embroidering hand shown in Figures 2 and 3;

Fig. 5 is a fragmentary detail view in side elevation of the mechanism for rotating the needle holder;

Fig. 6 is a fragmentary detail plan view similar to Fig. 2, illustrating a modified embodiment of the electro-mechanical embroidering hand;

Figs. 7, 8, 9 are detail side views of modified arrangements of the mechanism for rotating the needle holder;

Fig. 10 is a longitudinal sectional view of the switch device for controlling the electro-mechanic embroidering hands;

Fig. 11 is a schematic view of the four outer surfaces of the movable contact-bridging member of the switch device shown in Fig. 10;

Fig. 12 is a schematic view of the four inner surfaces of the stationary contact-carrying member of said switch device;

Fig. 13 is a detail view in side elevation of the combination switch and handle device for operating the embroidering apparatus;

Fig. 14 is a schematic view of the electric circuits of the embroidering apparatus;

Figs. 15 to 20 are schematical views of a pair of electro-mechanical embroidering hands with the parts thereof in the different positions of a complete embroidering operation;

Fig. 21 is a schematic view of a guide mechanism for the combined handle and switch device of the embroidering apparatus;

Figs. 22 and 23 are detail views of the proper guide member of the mechanism shown in Fig. 21.

Referring to the accompanying drawings and more particularly to Fig. 1, the embroidering apparatus according to my invention and in its embodiment as illustrated, comprises at least one pair of electro-mechanical embroidering hands 1, 1'. In general, quite a number of such embroidering hands are used in one and the same machine, the arrangement being preferably such that one or more pairs of co-operating embroidering hands are simultaneously operated. This depends entirely upon the size of the pattern of embroidery as well as upon the size of the piece of cloth on which the embroidery has to be produced. If, for instance, relatively small patterns have to be embroidered on large pieces of cloth, such as used for curtains, tapestry and upholstery, conveniently a large number of pairs of embroidering hands are simultaneously operated.

The arrangement of the embroidery hands 1, 1' of each pair must be in each case such that the needle-handling mechanisms thereof are exactly opposite each other. For this purpose, in the embodiment as illustrated they are fixedly mounted on parallel bars 2 which are arranged at exactly the same height and which in combination with the supports 3 form a structure capable of carrying an embroidery frame 4. For hanging up this frame, the connecting rods 5 of the supports 3 carry loose wheels 6, the rims of which, at the one hand, are interconnected by means of a bar 7 and, at the other hand, by means of rods 8 are connected to the frame-supporting bar 9, the arrangement of these connections being such that the embroidery frame 4 is hung up exactly in the midst between the embroidering hands 1 and 1' and that the same may be moved in the same vertical plane in every direction; the wheels 6 being provided with counter-weights 10 so that the necessary displacements of the cloth in the frame 4 may be very easily effected.

The displacement of the cloth after each stitch from one stitch point to the next one is effected by hand directly or by means of a pantograph 11 suitably mounted e. g. on a column 13 or the like and having the free end of its arm 12 provided with an operating handle 14 which is so arranged in relation to the pantograph 11 that it may be readily moved over a pattern of embroidery 15. The movements of the handle (see Fig. 13) are transferred by the pantograph 11 to the embroidery frame 4 so that any small displacement of said handle produces a like displacement of the cloth in the embroidery frame 4, eventually on a smaller or larger scale according to the construction of the pantograph 11.

Alternatively, the arrangement of the embroidering apparatus may also be such that the embroidery frame 4 is stationary and that the pairs of electro-mechanical embroidering hands 1, 1' have a movable supporting structure and by means of the latter are displaced after each stitch from one stitch point to the next one in accordance with the pattern of embroidery to be reproduced by the apparatus.

Each electro-mechanical embroidering hand 1, 1' comprises two electro-magnetic coils 16, 16' which in the embodiment as shown in Figure 2 are arranged one aside the other and are provided each with a movable core 17 and 17', respectively. The movable cores 17 and 17' have their ends connected to each other so as to form a rigid rectangular core structure. The two cores 17 and 17' are composed each of a portion sensitive to induction currents 17a and 17'a and of a portion not sensitive to such currents 17b and 17'b, the portions 17a and 17'a consisting of electrical or core sheet material, whereas the portions 17b and 17'b may be e. g. of aluminum, and the arrangement of these portions being such that like portions are situated diagonally opposite to each other, i. e. at opposite ends of the rectangular core structure, with the result that if the coils 16, 16' are alternatively energized, they will move the core structure to and fro.

The front end of the movable core structure 17, 17' forms a needle holder 18 so constructed that it may grasp a needle 19, pull it back and simultaneously invert its direction and thereafter push it on again. The needle 19 is a usual needle as used for hand-worked embroidery.

The needle holder 18 is formed by two short shafts. The opposite ends thereof are slightly rounded in such a manner that if they are pressed against each other, the needle 19 will be firmly grasped thereby. The outer ends of the needle holder 18 are rotatively mounted in the correspondingly perforated end portions of the core members 17 and 17' in such a manner that the two parts of the needle holder may axially move over a very short distance just sufficient to release the pressure upon the needle 19.

The needle holder 18 is operated by a mechanism comprising, in the embodiment as illustrated in Figures 2, 3 and 4, a pair of toothed wheels 20 and a pair of small longitudinal plates 21, these wheels and plates being fixedly mounted on the end portions of the needle holder projecting beyond the two core members 17 and 17', the proper ends thereof being rounded as shown at 22.

The rounded ends 22 of the needle holder 18 co-operate with the inner arms 23, which are under the pressure of springs 24 adjustably mounted by means of screw-threaded pins or the like on the outer arms 25. The arms 23 and 25 are secured to the casing (not shown) of the electromagnetic coils 16, 16' in any convenient manner. The inner arms 23 have their free ends provided with small recesses 26 so that, when the needle holder 18 is at the end of its forward stroke—in the position as shown in Fig. 2—the rounded ends of the needle holder (22) are not or are but slightly in contact with the arms 23 and the two parts of the needle holder are not pressed together by the springs 24, with the result that in this position the needle 19 is not firmly grasped by the holder 18, but may be readily removed therefrom.

On the other hand a relatively strong pressure is exerted upon the needle 19, as soon as the core structure 17, 17' moves backwards, so that the ends 22 are in contact with the thicker portions 23' of the arms 23 and now the springs 24 exert their full pressure upon the needle holder 18.

The base plate 26a, on which the electro-magnetic coils 16, 16' are mounted, is provided at its front end with a pair of extensions 27. Each extension carries a guide 28 for a spring-loaded toothed member 29 which is arranged in such a manner that the teeth thereof are situated aside the lower edge of the adjacent core member 17 or 17' and in the path of the toothed wheel 20, so that if the core structure 17, 17' moves backwards, the wheels 20 are caused to rotate and these in turn rotate the needle holder 18.

For the purpose of reversing the needle 19 in its direction, the needle holder 18 has to make one half of a revolution. It is possible to provide the toothed member 29 with a number of teeth sufficient to obtain a rotation of the needle holder over an angle of 180°. However, in order to secure a perfect operation of the mechanism, to each toothed wheel 20 there is fixedly secured a longitudinal plate 21, which, when the core structure 17, 17' moves to and fro, slides along and between the guide members 30, respectively, which by means of the supports 30' are mounted on the base plate 26a and the extension 27 and which include hinged portions 31 secured in place by leaf springs 31', these hinged portions being so arranged that when the toothed wheels 20 by their engagement with the toothed members 29 are rotated, the longitudinal plates 21 also rotate against the pressure of the springs 31', but as soon as the rotation of the wheels 20 and plates 21 exceeds the angle of 90°, their rotation is promoted by the spring-loaded hinged portions 31, with the advantageous result that the number of teeth of the toothed member 29 may be reduced and the backward stroke of the core structure 17, 17' may be shortened, because in any case the springs 31' will take care of the completion of one half of a revolution of the wheels 20 and plates 21 and therewith of the needle holder 18.

The needle-handling mechanism may, of course, be of different construction, and with regard hereto, reference is made to Figures 6, 7, 8 and 9, which at the same time show a modified arrangement of the electro-magnetic coils 16, 16', which in this embodiment of the electro-mechanical embroidering hand are disposed axially one behind the other, and the core structure consists of one rod 17 composed of a portion of electrical or core sheet material 17a and of two end portions of aluminum 17b.

The end portion 17b is forked as shown in Fig. 6 and is provided with two extensions 17' for rotatively supporting the needle holder 18. The arrangement of the embodiment as shown in Fig. 6, in as far as the toothed wheels 20, the rounded ends 22, the inner arms 23, the springs 24, the outer arms 25, and the toothed members 29 are concerned, is the same as described with reference to Figures 2, 3 and 5. In this embodiment according to Figures 6 and 7, the longitudinal plates 21 on the inner surface of each core extension 17' are under the pressure of a pair of leaf springs 31' which have their rear ends fixed to said extensions 17' in a suitable manner.

In the embodiment shown in Fig. 9, the longitudinal plates 21 are arranged in the outer surface of the extensions 17, 17' and move between two guide members 30 secured to the support 30', at least one of the said guide members being pivotally mounted on said support, and being under the pressure of a leaf spring (not shown).

According to another amendment as shown in Figures 8 and 9, instead of toothed wheels 20, a pair of rotating members 20' in the form of one half of a Maltese cross are used, which members are caused to rotate, when the core structure moves backwards, by a spring-loaded and pivotally mounted tooth member 29' which as is shown in Fig. 8 is normally maintained in upright position by a leaf spring 129, whereas the respective angular member 29' of Fig. 9 is under the action of a tension spring 129'.

In the different embodiments of the needle-handling mechanism, the spring-loaded member 29 or 29' is so arranged that it imparts a rotating movement to the needle holder 18 only when the core structure moves backwards, and that the said member is pushed downwards against the pressure of its spring, when said core structure and the rotating members 20 or 20' move forwards.

Referring back again to Figures 2, 3, and 5, while the core structure 17, 17' moves backwards and therewith effects the reversion of the needle 19 by means of the mechanism as hereinbefore described, the springs 24 by means of the thicker arm portions 23' press the two parts of the needle holder 18 together, so that the threaded embroidering needle 19 is firmly grasped, is pulled through the cloth and is turned over an angle of 180°. In this position, however, the needle 19 with its eye end portion projects beyond the rear side of the needle holder 18 and for making a new stitch or a return stitch through the cloth, it is necessary to move the needle forwards in the needle holder 18 and for being able to allow such movement of the needle, the two parts of the needle holder 18 must be slightly released. For this purpose, the core structure 17, 17' continues moving backwards, the rounded ends 22 of the needle holder 18 come into contact with the inner arms 23 behind their thicker portions 23', where the pressure exerted by the springs 24 is sufficiently lower to release the grasp of the needle holder, and now the rear end of the needle 19 meets a small buffer 32 (Fig. 2) provided on the front wall of the casing (not shown) of the electromagnetic coils 16, 16' and conveniently provided with a conical recess. In the embodiment according to Figure 6, a similar buffer or stop member may be secured to the base plate 26a or its extension 27 in any suitable known manner (not shown) so as to be stationary with regard to the reciprocating parts of the embroidering hands.

During the last part of the backward stroke of the core structure 17, 17' said buffer 32 not only pushes the needle 19 forward, but also corrects its position in the needle holder 18, so that now if the core structure, 17, 17' moves forward together with needle holder 18, the needle 19 is pushed through the cloth to be embroidered into the needle holder 18 of the co-operating embroidering hand arranged on the other side of said cloth, by which the needle is grasped at the moment at which the first-mentioned needle holder with the rounded ends 22 reaches the recesses 26 of the arms 23 and the pressure exerted upon the needle 19 is released, so that the needle now may be withdrawn.

Behind the electro-magnetic coils 16, 16' of each electro-mechanical embroidering hand there is provided the mechanism for pulling the embroidery thread after each stitch through the cloth on which the embroidery is produced. The base plate 26 of the coils 16, 16' at its rear end carries a bent arm 33. At the free end of the vertical portion of said arm 33 a thread-pulling lever 34 is pivotally mounted and provided with a brake spring 35. The rear end of said lever 34 carries a counterweight 36, whereas its front end is provided with a thread-engaging hook 37.

For operating the thread-pulling lever 34 with its thread-engaging hook 37, a double bent lever 38 is rotatively mounted in the vertical portion of the arm 33 which under the action of the spring 39 and under the control of the connecting rod 40, by means of its cross portion 38', moves the thread-pulling lever 34 upwards, as soon as the core structure 17, 17' moves backwards and the connecting rod 40 pivotally secured to said core structure permits the upward movement of the lever 38, as has been clearly shown in Fig. 3.

Figures 10, 11, 12 of the accompanying drawings illustrate a preferred embodiment of a switch device for the operation of the electro-mechanical embroidering hands in accordance with the invention. This switch device comprises a stationary contact-carrier 41 of insulating material in form of a tube of square cross section and a movable contact-bridging member 42 of insulating material slidably arranged in said contact-carrier 41. The contact-bridging member 42 is provided with a push button 43 and with a coil spring 44, as shown in Fig. 10. The contact-carrier 41 has each of its inner surfaces provided with a pair of electrical contacts A, B, C, D, these contact pairs disposed at different height and the contact pairs A and C being formed by rails extending downwards to the lower end of the contact-carrier 41, as has been clearly illustrated in Fig. 12. The contact-bridging member 42 has each of its outer surfaces provided with a layer or sheet of conductive material 45A, 45B, 45C, 45D, these layers or sheets being of different length and extending from the upper end of the member 42, as shown in Fig. 11; the same are destined to interconnect the contact pairs A, B, C, D, according to the position of the contact-bridging member 42 in the contact carrier 41, as will be hereinafter explained.

The contact pairs A, B, C, D of the contact carrier 41 are connected by means of conductors A', B', C', D' with the four electro-magnetic coils of a pair of electro-mechanical embroidering hands 1, 1', and this switch device is combined with a handle 46 (Fig. 13), which is fixedly mounted at 14 (Fig. 1), i. e. at the free end of the arm 12 of the pantograph 11 and which is provided with a pointed member 47 for enabling the embroiderer to readily determine on the pattern of embroidery the stitch points for the needles of the embroidering hands.

As soon as the embroiderer has moved the handle 46 so that the pointed member 47 indicates the next stitch point, he pushes the button 43 into the contact-carrier 41 and at this moment the electro-mechanical embroidering hands 1, 1' start their work as will hereinafter described in detail.

As has been clearly shown in Fig. 14, the four contact-pairs A, B, C, D of the contact carrier 41 are connected to the four electro-magnetic coils 16A, 16B, 16C, 16D respectively, with the interposition of suitable transformers 48. In the case that a number of electro-mechanical embroidering hands are used, these are connected in series.

The schematic view of Fig. 14 shows the switch device and the embroidering hands in the initial position, in which the conductive layers 45B and 45D interconnect the contacts of the pairs B and D, respectively, whereas the contacts A and C are interrupted. Thus current is supplied to the coils 16B and 16D only, the core structure 17AB is withdrawn from the cloth S (Fig. 15) on which the embroidery is to be produced, whereas the core structure 17CD is in its advanced position adjacent to said cloth. The two core structures are in their respective position ready for making a new stitch. If now the contact-bridging member 42 is moved into the contact carrier 41, the contacts B are at first interrupted, because the short conductive layer 45B is very soon advanced beyond said contacts. The contacts D remain interconnected due to the long conductive layer 45D. The two contacts A are closed by the conductive layer 45A, whereas the contacts C still remain interrupted. In this condition, therefore, the contacts D and A are interconnected and current is supplied to the coils 16D and 16A, so that the core structure 17CD remains in its advanced position, whereas the cores structure 17AB is advanced by the coil 16A and the needle 19 is pushed through the cloth S into the needle holder 18 of the core structure 17CD (Fig. 16).

The embroiderer continues pushing the contact-bridging member 42 into the contact carrier 41, at first the contacts D are interrupted in view of that the conductive layer 45D loses its contact therewith; the contacts B remain interrupted as before; the contacts A remain interconnected due to that the conductive layer 45A does not lose the contact with the contact rails A; finally, the contacts C are interconnected by the conductive layer 45C. Thus current is supplied to the coils 16A and 16C; the core structure 17AB remains in its advanced position, whereas the core structure 17CD is withdrawn (Fig. 17).

During this withdrawal of the core structure 17CD, its needle holder 18 makes one half of a revolution and effects the reversion of the needle 19 (Figures 18 and 19). At the same time, the withdrawal of the core structure 17CD permits the spring 39 to move the thread-pulling lever 34 upwards by means of the lever 38, 38' and causes the thread-engaging hook 37 to pull the embroidery thread through the cloth as shown in Figures 18 and 19, and by this operation the thread-pulling lever 34 belonging to the core structure 17AB is pulled down to its initial position (Fig. 20).

The embroiderer now determines the next stitch point moving the handle 46 with the pointed member 47 correspondingly, and thereafter he releases the pressure upon the push button 43, so that the spring 44 may now return the contact-bridging member 42 to its initial position. During this movement, at first the contacts C are interrupted and the contacts D are interconnected, whereas the contacts A remain interconnected and the contacts B remain interrupted. Now current is supplied to the coils 16A and 16D; the core structure 17CD is advanced and the needle is pushed through the cloth and is introduced into the needle holder of the core structure 17AB. Thereafter, during the last portion of the return stroke of the contact-bridging member 42, the conductive layer 45A looses its contact with the contacts A and interrupts the same, whereas the conductive layer 45B reaches the contacts B interconnecting them; the contacts D remain interconnected and the contacts C remain interrupted. The supply of current to the coil 16B causes the withdrawal of the core structure 17AB, during which the position of the needle 19 is reversed and the thread is pulled through the cloth S as above described; the position of the parts as shown in Fig. 15 is reestablished.

In order to facilitate the production of embroidery such as cross-stitch and similar types of stitch wherein like stitches are to be made several times, a guiding device, as shown in Figures 22 and 23, may be provided in connection with the handle 46 bearing the pointed member 47, said guiding device comprising a slide 50 mounted on a toothed or perforated rod 51, and provided with a small frame 52, whose window corresponds, for instance, to the area of one cross stitch.

The width of this window is equal to the distance between adjacent teeth or perforations of the rod 51, and the slide 50 is conveniently provided with a ratchet 53 or the like (Fig. 23), said ratchet acting in the displacement of the slide 50 from one tooth or perforation of the rod 51 to another so as to adjust it exactly in each position.

The rod 51 is fastened by means of a ratch or toothed rod 54 in a support 55 fixedly arranged at the frame 56, holding the embroidering pattern 15. The distance between adjacent teeth on the ratch 54 also corresponds to the width or height of the window of the small frame 52, so that an exact adjustment of the rod 51 is also achieved in vertical direction, in accordance with the height of the embroidering stitch, by inserting into the opening of the frame 52 the bent end portion of a rod 57 provided at the handle 46.

The small frame 52 of the slide 50 can be exchanged at convenience so as to make it possible to vary the width and height of the stitch, it also being convenient to allow for exchanging the rod 51 and the ratch 54.

It is of advantage to connect the ratchet 53 operatively with the handle 46, so that the embroiderer may lift it, when necessary, without letting go of the handle 46.

The present invention may thus be subject to various other modifications, and it should be understood that the same is in no way limited to the embodiments described and specified herein, but that other variations may be introduced into the same, without departing from the nature of this invention as defined in the following claims.

What I claim as new and desire to secure by Letters Patent is:

1. In an embroidering machine at least one pair of cooperating mechanical embroidering hands capable of handling a usual threaded embroidering needle and each of which comprises a pair of reciprocating arms, an axially slidable needle holder rotatively mounted in transverse bearings carried by the free ends of said arms, electromagnetic means in connection with said arms for reciprocating the latter, and cooperating mechanical means provided on said needle holder and on a stationary part of each embroidering hand for imparting to said needle holder one half of a revolution derived from the movement of said reciprocating arms.

2. In an embroidering machine at least one pair of cooperating mechanical embroidering hands, each of which comprises a pair of reciprocating arms, an axially slidable short shaft rotatively mounted in a transverse bearing carried by the free end of each of said arms, a transversely grooved head provided at each of the opposite ends of said short shafts for engaging and handling a usual threaded embroidering needle, electromagnetic means in connection with said arms for reciprocating the latter, and cooperating mechanical means provided on said short shafts and on a stationary part of each embroidering hand for imparting to said short shafts one half of a revolution derived from the movement of said reciprocating arms.

3. In an embroidering machine at least one pair of cooperating mechanical embroidering hands, each of which comprises a pair of reciprocating arms, a spring-loaded axially slidable short shaft rotatively mounted in a transverse bearing carried by the free end of each of said arms, a transversely grooved head provided at each of the opposite ends of said short shafts for engaging and handling a usual threaded embroidering needle, electromagnetic means in connection with said arms for reciprocating the latter, a toothed wheel provided on each of said short shafts, and rack means provided on a stationary part of each embroidering hand for engaging said toothed wheels and imparting to said short shafts one half of a revolution derived from the movement of said reciprocating arms.

4. In an embroidering machine at least one pair of cooperating mechanical embroidering hands, each of which comprises a pair of reciprocating arms, a spring-loaded axially slidable short shaft rotatively mounted in a transverse bearing carried by the free end of each of said arms, a transversely grooved head provided at each of the opposite ends of said short shafts for engaging and handling a usual threaded embroidering needle, electromagnetic means in connection with said arms for reciprocating the latter, a toothed wheel provided on each of said short shafts, rack means provided on a stationary part of each embroidering hand for engaging said toothed wheels and imparting to said short shafts one half of a revolution derived from the movement of said reciprocating arms, and a pair of stationary guide arms provided outside the said reciprocating arms and having portions of different thickness for controlling the pressure of said spring-loaded shafts for engaging and disengaging the embroidering needle between the grooved heads of said shafts.

5. In an embroidering machine at least one pair of cooperating mechanical embroidering hands, each of which comprises a pair of reciprocating arms, a spring-loaded axially slidable short shaft rotatively mounted in a transverse bearing carried by the free end of each of said arms, a transversely grooved head provided at each of the opposite ends of said short shafts for engaging and handling a usual threaded embroidering needle, electromagnetic means in connection with said arms for reciprocating the latter, a toothed wheel provided on each of said short shafts, rack means provided on a stationary part of each embroidering hand for engaging said toothed wheels and imparting to said short shafts one half of a revolution derived from the movement of said reciprocating arms, a pair of stationary guide arms provided outside the said reciprocating arms and having portions of different thickness for controlling the pressure of said spring-loaded shafts for engaging and disengaging the embroidering needle between the grooved heads of said shafts, and stop means provided on a stationary part of each embroidering hand for correcting the position of the embroidering needle handled by the grooved heads of said short shafts.

6. In an embroidering machine at least one pair of cooperating mechanical embroidering hands capable of handling a usual threaded embroiderig needle and each of which comprises a pair of reciprocating arms, a spring-loaded axially slidable needle holder rotatively mounted in transverse bearings carried by the free ends of said arms, electromagnetic means in connection with said arms for reciprocating the latter, cooperating mechanical means provided on said needle holder and on a stationary part of each embroidering hand for imparting to said needle holder one half of a revolution derived from the movement of said reciprocating arms, and spring-loaded lever means controlled by said reciprocating arms and associated with each embroidering hand for mechanically pulling the embroidering thread of said threaded embroidering needle after each stitch through a cloth to be embroiderd.

7. In an embroidering machine at least one pair of cooperating mechanical embroidering hands capable of handling a usual threaded embroidering needle and each of which comprises a pair of reciprocating arms, a spring-loaded axially slidable needle holder rotatively mounted in transverse bearings carried by the free ends of said arms, electromagnetic means in connection with said arms for reciprocating the latter, cooperating mechanical means provided on said needle holder and on a stationary part of each embroidering hand for imparting to said needle holder one half of a revolution derived from the movement of said reciprocating arms, and spring-loaded lever means controlled by said reciprocating arms and associated with each embroidering hand for mechanically pulling the embroidering thread of said threaded embroidering needle after each stitch through a cloth to be embroidered, said lever means consisting of a thread-pulling lever carrying at one end a thread-engaging hook and at its opposite end a counter-weight, a spring for operating said thread-pulling lever by means of a cranked lever which in turn is connected to the rear ends of the said reciprocating arms.

8. In an embroidering machine at least one pair of cooperating mechanical embroidering hands, according to claim 3, wherein the said toothed wheel of each short shaft is accompanied by a cam member, and spring-loaded lever means are provided on the said reciprocating arms for completing one half of a revolution of said short shafts.

9. An embroidering machine, comprising a number of pairs of cooperating mechanical embroidering hands capable of handling a like number of usual threaded embroidering needles and each of which comprises a pair of reciprocating arms forming part of an electromagnetic core structure, a spring-loaded axially slidable short shaft rotatively mounted in a transverse bearing carried by the free end of each of said arms, a transversally grooved head provided at each of the opposite ends of said shafts for engaging and handling one of said usual needles, electromagnetic coils in connection with said core structure for reciprocating said arms, a toothed wheel provided on each of said short shafts, and rack means provided on a stationary part of each embroidering hand for engaging said toothed wheels and imparting to said short shafts one half of a revolution derived from the movement of said reciprocating arms, a pair of stationary guide arms provided outside the said reciprocating arms and having portions of different thickness for controlling the pressure of said spring-loaded shafts for engaging and disengaging the embroidering needle between the grooved heads of said shafts, stop means provided on a stationary part of each embroidering head for correcting the position of the embroidering needle between said grooved heads, and spring-loaded lever means controlled by said reciprocating arms and associated with each embroidering hand for mechanically pulling the embrodiering thread of said threaded embroidering needle after each stitch through a cloth to be embroidered.

10. An embroidering machine according to claim 9, including a movably mounted embroidery frame for supporting the cloth to be embroidered and hand-operated lever means for adjusting the position of said frame after each embroidering stitch.

11. An embroidering machine according to claim 9, including a movably mounted counter-weighted embroidery frame for supporting the cloth to be embroidered and hand-operated lever means including a pantograph for adjusting the position of said frame after each embroidering stitch.

12. An embroidering machine according to claim 9, wherein the electromagnetic coils of the embroidering hands at each side of the cloth to be embroidered are connected in series and the two series of electromagnetic coils are connected to a hand-operated switch device for controlling the operation of said embroidering hands.

13. An embroidering machine according to claim 9, wherein the electromagnetic coils of the embroidering hands at each side of the cloth to be embroidered are connected in series and the two series of electromagnetic coils are connected to a hand-operated switch device for controlling the operation of said embroidering hands, said switch device comprising a stationary contact-carrier and a spring-loaded movable contact-bridging member provided with a push button for its operation against the pressure of its spring.

14. An embroidering machine according to claim 9, wherein a movable counter-weighted frame is provided for supporting the cloth to be embroidered and is connected with hand-operated lever means including a pantograph for adjusting the position of said frame after each embroidering stitch, and wherein the electromagnetic coils of the embroidering hands at each side of the cloth in said supporting frame are connected in series and the two series of electromagnetic coils are connected to a hand-operated switch device combined with said hand-operated lever means for controlling the operation of said embroidering hands.

15. Mechanical embroidering hand for use in embroidering machines capable of handling a usual threaded embroidering needle and comprising a pair of reciprocating arms, an axially slidable needle holder rotatively mounted in transverse bearings carried by the free ends of said arms, and cooperating mechanical means provided on said needle holder and on a stationary part of the embroidering hand for imparting to said needle holder one half of a revolution derived from the movement of said reciprocating arms.

16. Mechanical embroidering hand for use in embroidering machines capable of handling a usual threaded embroidering needle and comprising a pair of reciprocating arms, an axially slidable short shaft rotatively mounted in a transverse bearing carried by the free end of each of said arms, a transversely grooved head provided at each of the opposite ends of said short shafts for engaging and handling a usual threaded embroidering needle, and cooperating mechanical means provided on said short shafts and on a stationary part of the embroidering hand for imparting to said short shafts one half of a revolution derived from the movement of said reciprocating arms.

17. Mechanical embroidering hand for use in embroidering machines capable of handling a usual threaded embroidering needle and comprising a pair of reciprocating arms, a spring-loaded axially slidable short shaft rotatively mounted in a transverse bearing carried by the free end of each of said arms, a transversely grooved head provided at each of the opposite ends of said short shafts for engaging and handling a usual threaded embroidering needle, a toothed wheel provided on each of said short shafts, and rack means provided on a stationary part of the embroidering hand for engaging said toothed wheels and imparting to said short shafts one half of a revolution derived from the movement of said reciprocating arms.

18. Mechanical embroidering hand for use in embroidering machines capable of handling a usual threaded embroidering needle and comprising a pair of reciprocating arms, a spring-loaded axially slidable short shaft rotatively mounted in a transverse bearing carried by the free end of each of said arms, a transversely grooved head provided at each of the opposite ends of said shoft shafts for engaging and handling a usual threaded embroidering needle, a toothed wheel provided on each of said short shafts, rack means provided on a stationary part of each embroidering hand for engaging said toothed wheels and imparting to said short shafts one half of a revolution derived from the movement of said reciprocating arms, and a pair of stationary guide arms provided outside the said reciprocating arms and having portions of different thickness for controlling the pressure of said spring-loaded shafts for engaging and disengaging the embroidering needle between the grooved heads of said shafts.

19. Mechanical embroidering hand for use in embroidering machines capable of handling a usual threaded embroidering needle and comprising a pair of reciprocating arms, a spring-loaded axially slidable short shaft rotatively mounted in a transverse bearing carried by the free end of each of said arms, a transversely grooved head provided at each of the opposite ends of said short shafts for engaging and handling a usual threaded embroidering needle, a toothed wheel provided on each of said short shafts, rack means provided on a stationary part of each embroidering hand for engaging said toothed wheels and imparting to said short shafts one half of a revolution derived from the movement of said reciprocating arms, a pair of stationary guide arms provided outside the said reciprocating arms and having portions of different thickness for controlling the pressure of said spring-loaded shafts for engaging and disengaging the embroidering needle between the grooved heads of said shafts, and stop means provided on a stationary part of the embroidering hand for correcting the position of the embroidering needle handled by the grooved heads of said short shafts.

20. Mechanical embroidering hand for use in embroidering machines capable of handling a usual threaded embroidering needle and comprising a pair of reciprocating arms, a spring-loaded axially slidable needle holder rotatively mounted in transverse bearings carried by the free ends of said arms, cooperating mechanical means provided on said needle holder and on a stationary part of each embroidering hand for imparting to said needle holder one half of a revolution derived from the movement of said reciprocating arms, and spring-loaded lever means controlled by said reciprocating arms and associated with the embroidering hand for mechanically pulling the embroidering thread of said threaded embroidering needle after each stitch through a cloth to be embroidered.

21. Mechanical embroidering hand for us in embroidering machines capable of handling a usual threaded embroidering needle and comprising a pair of reciprocating arms, a spring-loaded axially slidable needle holder rotatively mounted in transverse bearings carried by the free ends of said arms, cooperating mechanical means provided on said needle holder and on a stationary part of each embroidering hand for imparting to said needle holder one half of a revolution derived from the movement of said reciprocating arms, and spring-loaded lever means controlled by said reciprocating arms and associated with the embroidering hand for mechanically pulling the embroidering thread of said threaded embroidering needle after each stitch through a cloth to be embroidered, said lever means consisting of a thread-pulling lever carrying at one end a thread-engaging hook and at its opposite end a counter-weight, a spring for operating said thread-pulling lever by means of a cranked lever which in turn is connected to the rear ends of the said reciprocating arms.

22. Mechanical embroidering hand according to claim 17, wherein the said toothed wheel of each short shaft is accompanied by a cam member, and spring-loaded lever means are provided on the said reciprocating arms to cooperate with said cam members for completing one half of a revolution of said short shafts.

EUGÈNE GERBER.

REFERENCES CITED

The following references are of record in the file of this patent:

UNITED STATES PATENTS

| Number | Name | Date |
|---|---|---|
| 306,288 | Shaffer et al. | Oct. 7, 1884 |
| 443,820 | Buss et al. | Dec. 30, 1890 |
| 990,198 | Joseph et al. | Apr. 18, 1911 |
| 1,523,535 | Eberhart | Jan. 20, 1925 |
| 2,232,692 | Diehl | Feb. 25, 1941 |